United States Patent
Epstein et al.

(10) Patent No.: US 9,678,824 B2
(45) Date of Patent: Jun. 13, 2017

(54) DURABILITY AND AVAILABILITY EVALUATION FOR DISTRIBUTED STORAGE SYSTEMS

(71) Applicant: INTERNATIONAL BUSINESS MACHINES CORPORATION, Armonk, NY (US)

(72) Inventors: Amir Epstein, Herzelia (IL); Michael E. Factor, Haifa (IL); Elliot K. Kolodner, Haifa (IL); Dmitry Sotnikov, Rishon-Lezion (IL)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 36 days.

(21) Appl. No.: 14/933,380

(22) Filed: Nov. 5, 2015

(65) Prior Publication Data
US 2017/0132056 A1    May 11, 2017

(51) Int. Cl.
*G06F 11/00* (2006.01)
*G06F 11/07* (2006.01)

(52) U.S. Cl.
CPC ........ *G06F 11/079* (2013.01); *G06F 11/0727* (2013.01); *G06F 11/0751* (2013.01); *G06F 11/0787* (2013.01)

(58) Field of Classification Search
CPC ............. G06F 11/0787; G06F 11/0772; G06F 11/0706; G06F 11/079; G06F 11/0751;
(Continued)

(56) References Cited

U.S. PATENT DOCUMENTS

| | | | |
|---|---|---|---|
| 6,553,389 B1 * | 4/2003 | Golding | G06F 11/1425 |
| 7,478,263 B1 * | 1/2009 | Kownacki | G06F 11/2028 714/10 |

(Continued)

FOREIGN PATENT DOCUMENTS

AU    2014101196 A4    11/2014

OTHER PUBLICATIONS

Al-Sharawneh et al., "Web Service Reputation-Semantics and Assessment based on Customer Feedback Forecasting Model", 2010 14th IEEE International Enterprise Distributed Object Computing Conference Workshop; 10 pgs.
(Continued)

*Primary Examiner* — Nadeem Iqbal
(74) *Attorney, Agent, or Firm* — Cantor Colburn LLP; David Quinn (57) ABSTRACT

Embodiments include evaluating durability and availability of a distributed storage system. Aspects include receiving a configuration of the distributed storage system, identifying a failure model for each component of the distributed storage system. Aspects also include generating a series of failure events for each component of the distributed storage system based on the failure model and calculating a recovery time for each failed component based on a network recovery bandwidth, a disk recovery bandwidth, a total capacity of simultaneous failed storage devices and a resiliency scheme used by the in the distributed storage system. Aspects further include collecting data regarding the series of failures and the recovery times, calculating an observed distribution of component failures from the collected data and calculating the availability and durability of the distributed storage system based on the observed distribution of component failures and using probabilistic durability and availability models.

20 Claims, 4 Drawing Sheets

(58) Field of Classification Search
CPC ............. G06F 11/0793; G06F 11/0778; H04L 41/5003; H04L 41/142; H04L 41/147; H04L 41/5038
See application file for complete search history.

(56) References Cited

U.S. PATENT DOCUMENTS

| | | | |
|---|---|---|---|
| 7,933,926 B2 | 4/2011 | Ebert | |
| 8,326,807 B2 | 12/2012 | Aiyer et al. | |
| 8,943,061 B2 | 1/2015 | Fraczak et al. | |
| 9,317,576 B2* | 4/2016 | Merriman | G06F 17/30578 |
| 2009/0037414 A1 | 2/2009 | Olivier et al. | |
| 2009/0265360 A1* | 10/2009 | Bachwani | G06F 11/008 |
| 2010/0101298 A1 | 4/2010 | Carstensen | |
| 2013/0173404 A1 | 7/2013 | Scipioni | |
| 2013/0304543 A1 | 11/2013 | Anderson | |
| 2013/0346155 A1* | 12/2013 | Briggs | G06Q 30/0203 705/7.32 |
| 2014/0044250 A1 | 2/2014 | Gartner et al. | |
| 2014/0136571 A1 | 5/2014 | Bonvin et al. | |
| 2014/0317006 A1 | 10/2014 | Brill et al. | |
| 2015/0039828 A1 | 2/2015 | Kazi et al. | |
| 2015/0088608 A1 | 3/2015 | Cama et al. | |
| 2015/0120389 A1 | 4/2015 | Zhang et al. | |
| 2015/0170228 A1* | 6/2015 | Wheeler | G06Q 50/01 705/319 |

OTHER PUBLICATIONS

Choi et al. "Eliciting Customer Preferences for Products From Navigation Behavior on the Web: A Multicriteria Decision Approach With Implicit Feedback", IEEE Transactions on Systems, Man, and Cybernetics—Part A . . . , vol. 39, No. 4, Jul. 2009; pp. 880-889.

Chun et al., "Efficient Replica Maintenance for Distributed Storage Systems", downloaded from http://oceanstore.cs.berkeley.edu/publications/papers/pdf/carbonite06.pdf; downloaded Nov. 5, 2015; Undated; 14 pgs.

Gharaibeh et al., "ThriftStore: Finessing Reliability Tradeoffs in Replicated Storage Systems", 2009, downloaded URL: http://datasys.cs.iit.edu/events/TPDS_MTC/papers/TPDSSI-2009-12-0599.pdf; 15 pgs.

Hu et al., "Collaborative Filtering for Implicit Feedback Datasets", IEEE International Conference on Data Mining—ICDM , 2008; DOI: 10.1109/ICDM.2008.22; pp. 263-272.

Ramabhadran et al., "Durability of Replicated Distributed Storage Systems", Sigmetrics' 08, Jun. 2-6, 2008, 2 pgs.

* cited by examiner

DURABILITY AND AVAILABILITY EVALUATION FOR DISTRIBUTED STORAGE SYSTEMS

BACKGROUND

The present disclosure relates to distributed storage systems and more specifically, to methods, systems and computer program products for durability and availability evaluation for distributed storage systems.

Data reliability is crucial for distributed storage systems. Distributed storage systems typically use replication and erasure coding schemes to increase their resiliency to failures. Replication stores replicas (copies) of data across different failure domains. Erasure coding divides data into data and parity chunks, and distributes them across different failure domains. The different failure domains can be defined by different storage devices, different servers, racks and even data centers. In distributed storage system all the components are connected by a network, and can be accessed one from another.

Durability and availability are two important metrics that are commonly used for measuring and comparing of the overall reliability of distributed storage systems in general and in particular for cloud storage. As used herein the availability of a distributed storage system is the fraction of time that the data is accessible through the system. As used herein the durability of a distributed storage system is a percentage of the data that remains intact after a predetermined time period. For example, if after a year of use 0.01 percent of the data stored in the distributed storage system has been lost and is not recoverable, the durability of the distributed storage system is determined to be 99.99% (100−.01).

In general, it is not practical to measure the availability and durability of a distributed storage systems using a short running benchmark test or based on a scaled down system because both availability and durability are directly influenced by scale and by low probability events (failures) that occur over time. Nevertheless, estimates of an expected availability and durability of a distributed storage system are critical when designing, deploying and operating a distributed storage system.

One common approach to estimating the durability and availability of a distributed storage system is to use analytic models that consider simplistic and non-realistic assumptions on the distributed storage system, such as independent exponential distributions for failures and repair. Using these assumptions, Markov models can be constructed to obtain closed form equations for evaluating durability and availability. However, these models do not take into account various characteristics of the distributed storage system such as the realistic distributions of disk, and server failures and the influence of network bandwidth and disk repair bandwidth on disk recovery time, which increases with the number of simultaneous failures. The latter has large impact on the likelihood of additional failures causing data loss and thus on durability and availability. Additional characteristics are system configuration and scale.

Another approach to estimating the durability and availability of a distributed storage system is to use simulation. However, existing simulation methods do not model appropriately the network portion of the distributed storage system and the influence of network bandwidth, disk bandwidth and simultaneous failures on disk recovery time. This is despite the fact that these factors can have a large impact on the probability of data loss and data unavailability and thus on durability and availability.

SUMMARY

In accordance with an embodiment, a method for evaluating durability and availability of a distributed storage system is provided. The method includes receiving a configuration of the distributed storage system, identifying a failure model for each type of component of the distributed storage system and identifying a network recovery bandwidth and a disk recovery bandwidth for the distributed storage system. The method also includes generating a series of failure events for each type of component of the distributed storage system based on the failure model, calculating, by a processor, a recovery time for each failed component based on the network recovery bandwidth, the disk recovery bandwidth and a total capacity of simultaneous failed storage devices and a resiliency scheme used by the in the distributed storage system, and collecting data regarding the series of failures and the recovery times. The method further includes calculating, by the processor, an observed distribution of component failures from the collected data and calculating, by the processor, the availability and the durability of the distributed storage system based on the observed distribution of component failures.

In accordance with another embodiment, a processing system for evaluating durability and an availability of a distributed storage system includes a processor in communication with one or more types of memory. The processor is configured to receive a configuration of the distributed storage system, identify a realistic failure model for each type of component of the distributed storage system, and identify a network recovery bandwidth and a disk recovery bandwidth for the distributed storage system. The processor is also configured to generate a series of failure events for each type of component of the distributed storage system based on the realistic failure model, calculate a recovery time for each failed component based on the network recovery bandwidth, the disk recovery bandwidth and a total capacity of simultaneous failed storage devices and a resiliency scheme used by the in the distributed storage system, and collect data regarding the series of failures and the recovery times. The processor is further configured to calculate an observed distribution of component failures from the collected data and calculate the availability and the durability of the distributed storage system based on the observed. distribution of component failures.

In accordance with a further embodiment, a computer program product for evaluating a durability and an availability of a distributed storage system includes a non-transitory storage medium readable by a processing circuit and storing instructions for execution by the processing circuit for performing a method. The method includes receiving a configuration of the distributed storage system, identifying a failure model for each type of component of the distributed storage system and identifying a network recovery bandwidth and a disk recovery bandwidth for the distributed storage system. The method also includes generating a series of failure events for each type of component of the distributed storage system based on the failure model, calculating a recovery time for each failed component based on the network recovery bandwidth, the disk recovery bandwidth and a total capacity of simultaneous failed storage devices and a resiliency scheme used by the in the distributed storage system, and collecting data regarding the series of failures and the recovery times. The method further includes calculating an observed distribution of component failures from the collected data and calculating, by the processor, the availability and the durability of the distributed storage system based on the observed distribution of component failures.

BRIEF DESCRIPTION OF THE DRAWINGS

The subject matter which is regarded as the invention is particularly pointed out and distinctly claimed in the claims at the conclusion of the specification. The foregoing and other features and advantages of the invention are apparent from the following detailed description taken in conjunction with the accompanying drawings in which:

DETAILED DESCRIPTION

Disclosed herein are systems, methods and computer program products for evaluating durability and availability of a distributed storage system that combines simulation and probabilistic models. This combination enables to estimate durability and availability of large scale distributed storage system both accurately and efficiently, by modeling real system behavior. This is in contrast to previous methods that do not have all these properties. The simulation simulates both the storage devices and the network of the distributed storage system, including failures and recovery times that are influenced by network and disk bandwidth and simultaneous failures. Given failure statistics of the simulated system the probabilistic models can be used to estimate durability and availability. In exemplary embodiments, the method includes realistic distributions of disk and server failures as well as a non-recoverable bit error rate. By including both the storage devices and network of the distributed storage system, trade-offs between durability, storage and network costs can be evaluated.

Figure 1:
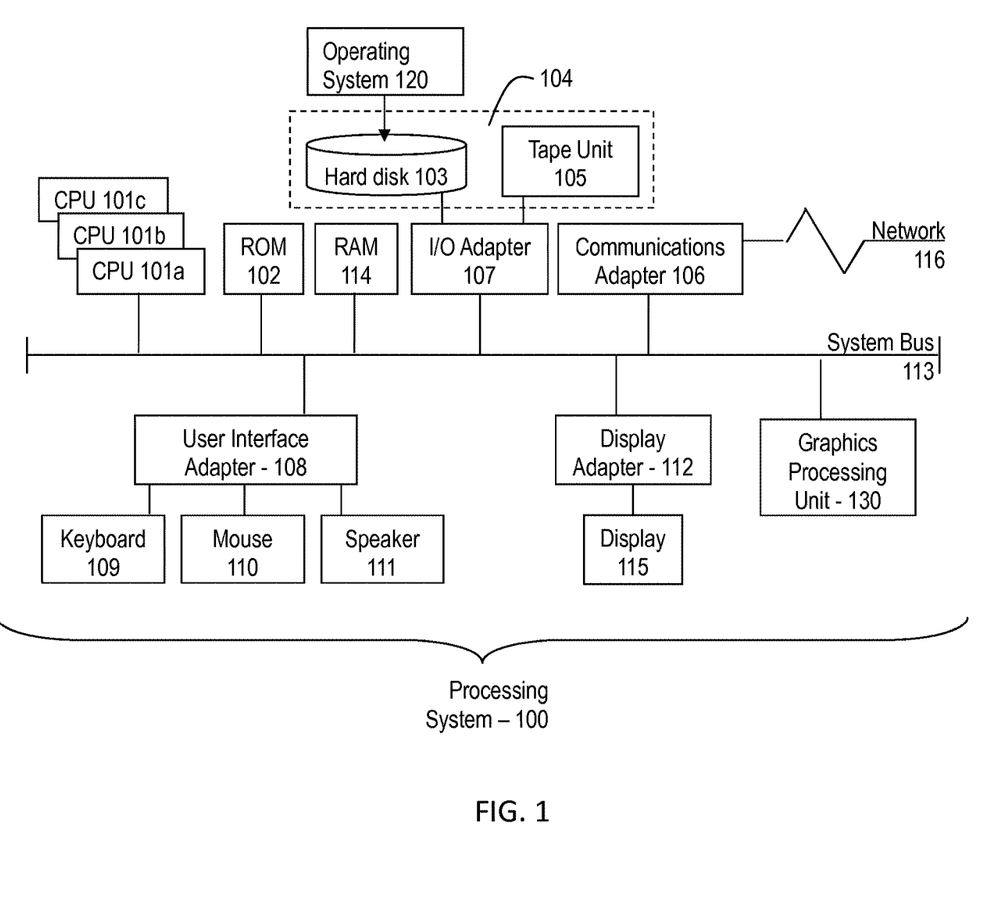
FIG. 1 is a block diagram illustrating one example of a processing system for practice of the teachings herein.

Referring to FIG. 1, there is shown an embodiment of a processing system 100 for implementing the teachings herein. In this embodiment, the system 100 has one or more central processing units (processors) 101a, 101b, 101c, etc. (collectively or generically referred to as processor(s) 101). In one embodiment, each processor 101 may include a reduced instruction set computer (RISC) microprocessor. Processors 101 are coupled to system memory 114 and various other components via a system bus 113. Read only memory (ROM) 102 is coupled to the system bus 113 and may include a basic input/output system (BIOS), which controls certain basic functions of system 100.

FIG. 1 further depicts an input/output (I/O) adapter 107 and a network adapter 106 coupled to the system bus 113. I/O adapter 107 may be a small computer system interface (SCSI) adapter that communicates with a hard disk 103 and/or tape storage drive 105 or any other similar component. I/O adapter 107, hard disk 103, and tape storage device 105 are collectively referred to herein as mass storage 104. Operating system 120 for execution on the processing system 100 may be stored in mass storage 104. A network adapter 106 interconnects bus 113 with an outside network 116 enabling data processing system 100 to communicate with other such systems. A screen (e.g., a display monitor) 115 is connected to system bus 113 by display adaptor 112, which may include a graphics adapter to improve the performance of graphics intensive applications and a video controller. In one embodiment, adapters 107, 106, and 112 may be connected to one or more I/O busses that are connected to system bus 113 via an intermediate bus bridge (not shown). Suitable I/O buses for connecting peripheral devices such as hard disk controllers, network adapters, and graphics adapters typically include common protocols, such as the Peripheral Component Interconnect (PCI). Additional input/output devices are shown as connected to system bus 113 via user interface adapter 108 and display adapter 112. A keyboard 109, mouse 110, and speaker 111 all interconnected to bus 113 via user interface adapter 108, which may include, for example, a Super I/O chip integrating multiple device adapters into a single integrated circuit.

In exemplary embodiments, the processing system 100 includes a graphics processing unit 130. Graphics processing unit 130 is a specialized electronic circuit designed to manipulate and alter memory to accelerate the creation of images in a frame buffer intended for output to a display. In general, graphics processing unit 130 is very efficient at manipulating computer graphics and image processing, and has a highly parallel structure that makes it more effective than general-purpose CPUs for algorithms where processing of large blocks of data is done in parallel.

Thus, as configured in FIG. 1, the system 100 includes processing capability in the form of processors 101, storage capability including system memory 114 and mass storage 104, input means such as keyboard 109 and mouse 110, and output capability including speaker 111 and display 115. In one embodiment, a portion of system memory 114 and mass storage 104 collectively store an operating system such as the AIX® operating system from IBM Corporation to coordinate the functions of the various components shown in FIG. 1.

Figure 2:
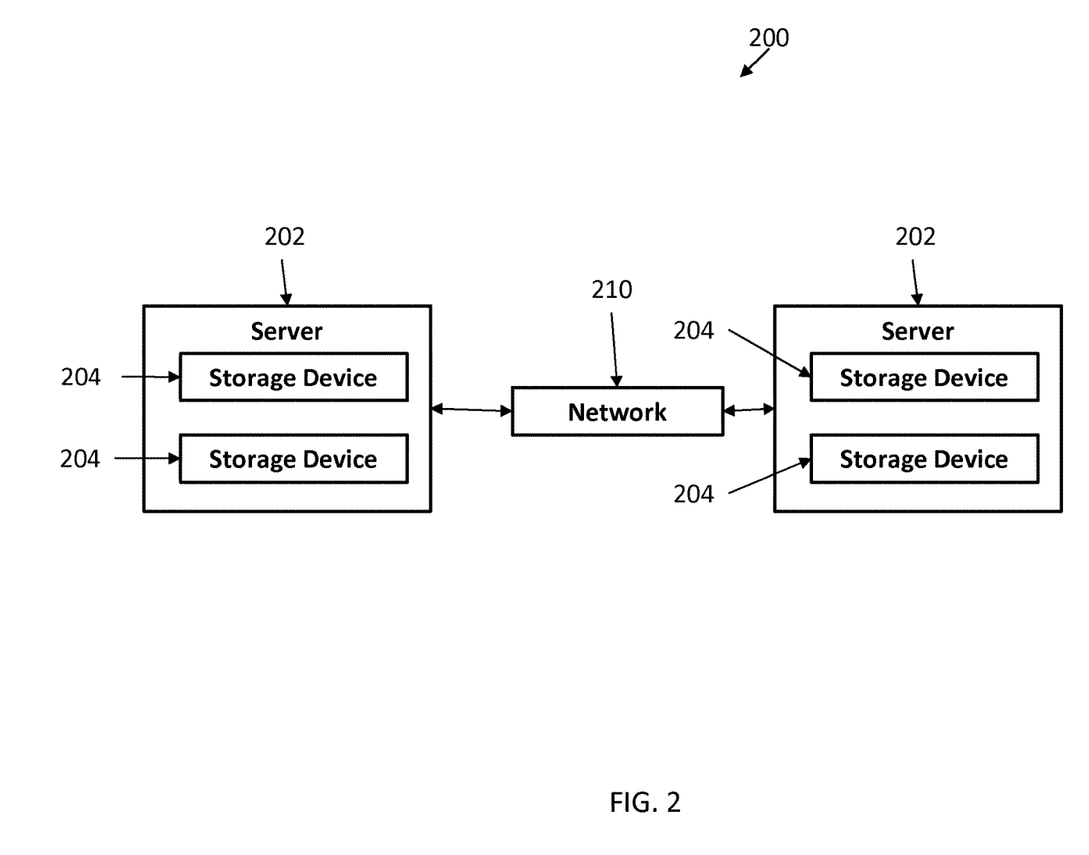
FIG. 2 is a block diagram illustrating a distributed storage system in accordance with an exemplary embodiment.

Referring now to FIG. 2, a block diagram illustrating a distributed storage system 200 in accordance with an exemplary embodiment is shown. As illustrated, the distributed storage system 200 includes multiple servers 202 that each include multiple storage devices 204. The storage devices 204 may include any type of storage device including, but not limited to, hard disk drives, solid state drives, optical storage devices, and the like. The servers 202 are connected by a network 210, which may include various networking components such as switches, routers, etc. In exemplary embodiments, the network 210 is characterized by a maximum bandwidth and may include a recovery bandwidth that has been pre-allocated for use by the distributed storage system 200 in recovering from errors. This pre-allocated bandwidth may be a fixed data transfer rate (i.e., 5 gigabits per second) or it may be fixed percentage of the overall bandwidth of the network (i.e., 50%). In addition, each disk is characterized by disk bandwidth for recovery. This pre-allocated disk bandwidth may be a fixed data transfer rate or percentage of disk bandwidth.

Figure 3:
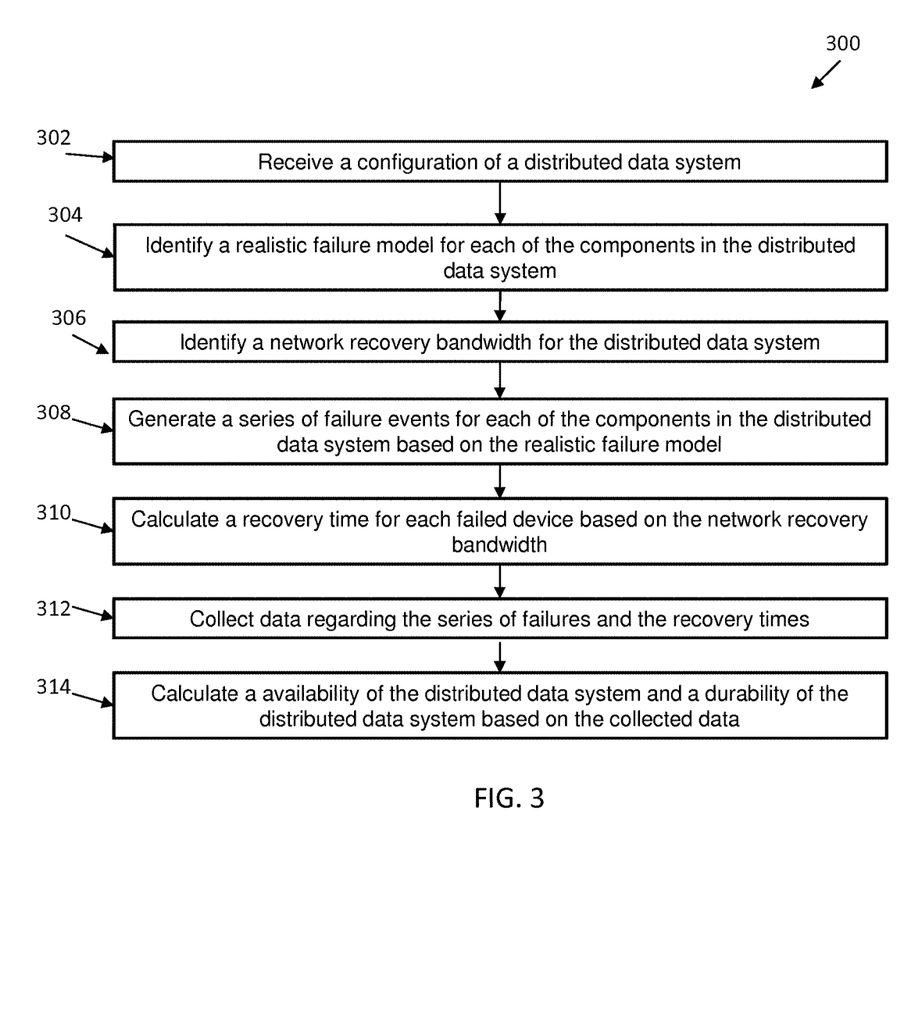
FIG. 3 is a flow diagram of a method for evaluating a durability and an availability of a distributed storage system in accordance with an exemplary embodiment.

Referring now to FIG. 3, a flow diagram of a method 300 for evaluating a durability and availability of a distributed storage system in accordance with an exemplary embodiment is shown. As shown at block 302, the method 300 includes receiving a configuration of a distributed storage system. The configuration of the distributed storage system may include, but is not limited to, a number of servers, a number of storage devices per server, a capacity of each storage device, resiliency schemes (e.g., replication or erasure coding) used by the distributed storage system, network and disk bandwidth for recovery, and the like. Next, as shown at block 304, the method 300 includes identifying a realistic failure model for each of the components in the distributed storage system and non-recoverable bit error rates. In exemplary embodiments, a realistic failure model is identified for servers and for storage devices. The realistic failure models and non-recoverable bit error rates may be obtained from a manufacturer of the component or the realistic failure models may be obtained based on an observed failure history of the components. Without loss of generality the failure model can be described by a distribution function, e.g. Weibull distribution can be used to get an accurate estimate of disk failures, or by a trace that contains the timestamps of real failure events. The method 300 also includes identifying a network recovery bandwidth and a disk recovery bandwidth for the distributed storage system, as shown at block 306. In exemplary embodiments, the network recovery bandwidth is a bandwidth of the network of the distributed storage system that is available for recovering from errors of the distributed storage system.

Continuing with reference to FIG. 3, the method 300 includes generating a series of failure events for each of the components in the distributed storage system based on the realistic failure model, as shown at block 308. In exemplary embodiments, any of a variety of simulation techniques may be used to generate the series of failure events for the components, which include both the servers and the storage devices. Next, as shown at block 310, the method 300 includes calculating a recovery time for each failed device based on the network recovery bandwidth, disk recovery bandwidth and simultaneous failures of devices. In exemplary embodiments, the recovery time for each failed device is dependent upon the network recovery bandwidth that is available at the time of the failure. For example, when multiple components fail at, or around, the same time, the amount of network recovery bandwidth that can be used to copy data from one component to another across the network may have a substantial impact on the recovery time of the failed device. The method 300 also includes collecting data regarding the series of failures and the recovery times, as shown at block 312. The collected data may include, but is not limited to, a total amount of failed devices of each type (disks and servers) at each time period and a total amount of failed devices of each type when an additional device fails (i.e., at times of device failures). Next, as shown at block 314, the method 300 includes calculating the availability of the distributed storage system and the durability of the distributed storage system based on the collected data.

In exemplary embodiments, the method 300 combines a simulation and a probabilistic model. The simulation simulates both the storage devices and the network of the distributed storage system. The method 300 includes simulating failures and recovery of hardware devices (storage devices, servers) while explicitly accounting for the influence of network and disk bandwidth and simultaneous failures on recovery times. The method 300 also includes probabilistic models for calculating the probability of data loss and data unavailability for disk and server failures event and non-recoverable bit errors. The probability of data loss is equal to probability that the original data cannot be reconstructed from the remaining chunks (replicas for replication scheme). The remaining chunks are chunks that are not located on the failed devices or damaged by unrecoverable bit-errors. In exemplary embodiments, this probability is calculated by considering all possible placements (with anti-collocation constraints for failure domains) of data chunks (replicas for replication scheme). As a result, accurate durability and availability estimates can be obtained in a timely manner.

In exemplary embodiments, the method 300 can be executed by a processing system similar to the one shown in FIG. 1. The processing system is configured to perform a simulation of the use of the distributed storage system combined with analytical models for estimating durability and availability of the distributed storage system (based on the observed failure distribution obtained in simulation). The processing system may include a failure events generator, a recovery events simulator, a history manager, an event statistics manager and a durability and availability calculator. For each hardware device type, e.g., hard drive, physical server, the failure events generator is configured to generate failure events for each device type according to a realistic failure model for the device (e.g., Weibull distribution for hard drives). The recovery events simulator is configured to calculate recovery events (times) for each device based on network recovery bandwidth, disk recovery bandwidth, device storage capacity and amount of simultaneous failure events. The history manager is configured to record failure and recovery events and\or aggregation of these events. The event statistics manager is configured to use the data collected by the history manager to calculate and store the observed distribution of joint failure events and statistical metrics such as the expected number of joint failure events (e.g., number of failed disks and number of failed servers) for a pre-defined time period (e.g., a year). The durability and availability calculator is configured to use event statistics, in particular expected number of joint failure events, calculated by events statistics calculator to calculate durability and availability according to probabilistic durability and availability models.

In one embodiment, the probability of data loss of a data object p can be evaluated as follows: let $X_k$ be a random variable for the annual number of k disk failure events (in such event there are exactly k failed disks in the system immediately after disk fails); let N denote the number of disks in the system; let A denote the event that a data object is lost; and let $B_k$ denote k disk failures event. Then, $P[A|B_k]$ is the conditional probability of losing a data object in k disk failures event. The probability of data loss p is at most:

$$p = E(Y) = \sum_{k=1}^{N} E(X_k) P[A \mid B_k]$$

For example for 3-way replication the probability of data loss p is at most $$p = \sum_{k=3}^{N} E(X_k) \frac{3(k-1)(k-2)}{N(N-1)(N-2)}$$

Since in this case $$P[A \mid B_k] = \frac{3(k-1)(k-2)}{N(N-1)(N-2)}$$

This indicates that the durability is at least 100(1−p).

Another example is erasure coding such as Reed-Solomon, where RS(d,m) denotes d data chunks and m error correcting (parity) chunks. For RS erasure code, a data object can be reconstructed from any d chunks. Let r=d+m. In this case the probability of data loss is at most $$p = \sum_{k=m+1}^{N} E(X_k) \frac{\binom{k-1}{m}\binom{N-k}{r-m-1}}{\binom{N}{r}},$$

since $$P[A|B_k] = \frac{\binom{k-1}{m}\binom{N-k}{r-m-1}}{\binom{N}{r}}$$

In exemplary embodiments, the conditional probability $P[A|B_k]$ can be calculated for other erasure coding schemes and can be extended to account for server failures and unrecoverable bit errors.

Figure 4:
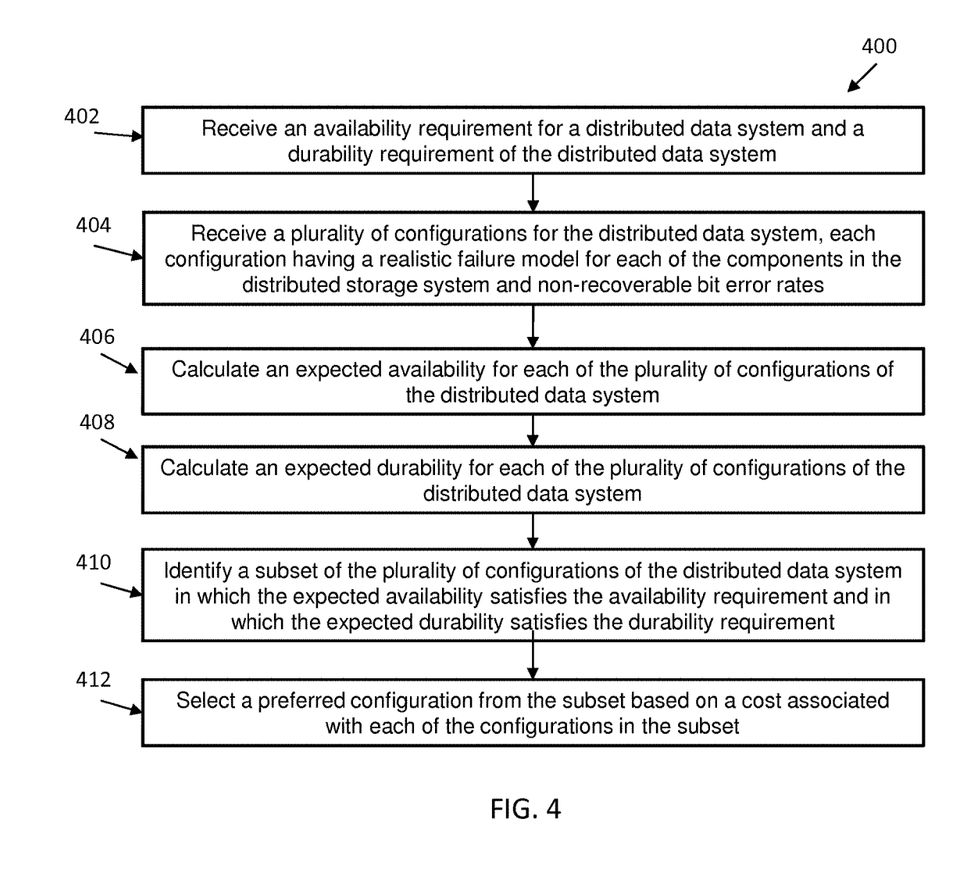
FIG. 4 is a flow diagram of a method for configuring a distributed storage system in accordance with an exemplary embodiment.

Referring now to FIG. 4, a flow diagram of a method 400 for configuring a distributed storage system in accordance with an exemplary embodiment is shown. As shown at block 402, the method 400 includes receiving an availability requirement for a distributed storage system and a durability requirement of the distributed storage system. Next, as shown at block 404, the method 400 includes receiving a plurality of configurations for the distributed storage system. In exemplary embodiments, each of the plurality of configurations may include, but is not limited to, a number of servers, a number of storage devices per server, a capacity of each storage device, a replication or erasure coding schemes used by the distributed storage system, and network and disk bandwidth for recovery and the like. Each configuration includes a realistic failure model for each of the components in the distributed storage system and non-recoverable bit error rates. The method 400 also includes calculating an expected availability for each of the plurality of configurations of the distributed storage system, as shown at block 406. The method 400 further includes calculating an expected durability for each of the plurality of configurations of the distributed storage system, as shown at block 408. In exemplary embodiments, the calculation of the availability and durability for each of the plurality of configurations of the distributed storage system may be performed using a method as shown in FIG. 3. Next, as shown at block 410, the method 400 includes identifying a subset of the plurality of configurations of the distributed storage system in which the expected availability satisfies the availability requirement and in which the expected durability satisfies the durability requirement. The method 400 also includes selecting a preferred configuration of the distributed storage system from the subset, as shown at block 412. In exemplary embodiments, the preferred configuration of the distributed storage system may be selected based on a cost associated with each of the configurations in the subset and based on the expected availability and durability. For example erasure code may require 50% of total disk capacity required by replication scheme for the same usable storage capacity. However it requires much more network bandwidth for recovery from failures. Both network and storage costs are significant portion of the overall cost of the system and should be taken into account during the system planning.

In exemplary embodiments, the operation of a distributed storage system can be monitored and the failures of components of the distributed storage system can be used to update the probabilistic models that are used for each of the components. In addition, upon the failure of one or more components, a processing system may be aware of the network bandwidth pre-allocated for recovery from component failures and may generate an alert if the allocated network bandwidth for recovery is bellow a threshold that is required to achieve the target durability and availability. For example if the failure pattern changed over time, since the disks aging, disk replacements or bad batch of disks usage, then the network bandwidth for recovery should be increased in order to achieve the target durability and availability. In this case the network administrator would get an alert that describes the required reconfiguration. In another example, the processing system may be configured to automatically increase the network bandwidth allocated for recovery from failures in order to meet a target durability value.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A computer-implemented method for evaluating a durability and an availability of a distributed storage system, the method comprising:
   receiving a configuration of the distributed storage system;
   identifying a failure model for each type of component of the distributed storage system;
   generating a series of failure events for each type of component of the distributed storage system based on the failure model;
   calculating, by a processor, a recovery time for each failed component based on a network recovery bandwidth for the distributed storage system, a disk recovery bandwidth for the distributed storage system, a total capacity of simultaneous failed storage devices and a resiliency scheme used by the in the distributed storage system;
   collecting data regarding the series of failures and the recovery times;
   calculating, by the processor, an observed distribution of component failures from the collected data; and
   calculating, by the processor, the availability and the durability of the distributed storage system based on the observed distribution of component failures.

2. The computer-implemented method of claim 1, wherein the configuration of the distributed storage system includes at least one of: a number of servers in the distributed storage system; a number of storage devices per server in the distributed storage system; a capacity of each storage device in the distributed storage system; the resiliency scheme used by the in the distributed storage system; a network bandwidth for recovery; and a storage device bandwidth for recovery.

3. The computer-implemented method of claim 1, wherein the network recovery bandwidth is a fixed amount of bandwidth of a network of the distributed storage system that has been reserved for recovering from errors of the components of the distributed storage system.

4. The computer-implemented method of claim 1, wherein the failure model is obtained from a manufacturer of the component.

5. The computer-implemented method of claim 1, wherein the failure model is obtained based on an observed failure history of a component type.

6. The computer-implemented method of claim 1, wherein the recovery time for each failed device is dependent upon the network recovery bandwidth that is available during the failure which is a function of network recovery bandwidth, disk recovery bandwidth and simultaneous failure events.

7. The computer-implemented method of claim 1, wherein the collected data includes a total amount of failed devices of each type at each time period and a total amount of failed devices of each type when a device fails.

8. The computer-implemented method of claim 1, further comprising:
receiving a target durability and a target availability and a plurality of available configurations for the distributed storage system;
calculating, by the processor, an expected availability for each of the plurality of available configurations of the distributed storage system;
calculating, by the processor, an expected durability for each of the plurality of available configurations of the distributed storage system;
identifying a subset of the plurality of configurations of the distributed storage system in which the expected availability satisfies the availability requirement and in which the expected durability satisfies the durability requirement;
selecting a preferred configuration of the distributed storage system from the subset.

9. A computer program product for evaluating durability and an availability of a distributed storage system, the computer program product comprising:
a non-transitory storage medium readable by a processing circuit and storing instructions for execution by the processing circuit for performing a method comprising:
receiving a configuration of the distributed storage system;
identifying a failure model for each type of component of the distributed storage system;
generating a series of failure events for each type of component of the distributed storage system based on the failure model;
calculating a recovery time for each failed component based on a network recovery bandwidth for the distributed storage system, a disk recovery bandwidth for the distributed storage system, a total capacity of simultaneous failed storage devices and a resiliency scheme used by the in the distributed storage system;
collecting data regarding the series of failures and the recovery times;
calculating an observed distribution of component failures from the collected data; and
calculating the availability and the durability of the distributed storage system based on the observed distribution of component failures.

10. The computer program product of claim 9, wherein the configuration of the distributed storage system includes at least one of: a number of servers in the distributed storage system; a number of storage devices per server in the distributed storage system; a capacity of each storage device in the distributed storage system; the resiliency scheme used by the in the distributed storage system; a network bandwidth for recovery; and a storage device bandwidth for recovery.

11. The computer program product of claim 9, wherein the network recovery bandwidth is a fixed amount of bandwidth of a network of the distributed storage system that has been reserved for recovering from errors of the components of the distributed storage system.

12. The computer program product of claim 9, wherein the failure model is obtained from a manufacturer of the component.

13. The computer program product of claim 9, wherein the failure model is obtained based on an observed failure history of a component type.

14. The computer program product of claim 9, wherein the recovery time for each failed device is dependent upon the network recovery bandwidth that is available during the failure which is a function of network recovery bandwidth, disk recovery bandwidth and simultaneous failure events.

15. The computer program product of claim 9, wherein the collected data includes a total amount of failed devices of each type at each time period and a total amount of failed devices of each type when device fails.

16. A processing system for evaluating durability and an availability of a distributed storage system, comprising:
a processor in communication with one or more types of memory, the processor configured to:
receive a configuration of the distributed storage system;
identify a failure model for each type of component of the distributed storage system;
generate a series of failure events for each type of component of the distributed storage system based on the failure model;
calculate a recovery time for each failed component based on a network recovery bandwidth for the distributed storage system, a disk recovery bandwidth for the distributed storage system, a total capacity of simultaneous failed storage devices and a resiliency scheme used by the in the distributed storage system;
collect data regarding the series of failures and the recovery times;
calculate an observed distribution of component failures from the collected data; and
calculate the availability and the durability of the distributed storage system based on the observed distribution of component failures.

17. The processing system of claim 16, wherein the configuration of the distributed storage system includes at least one of: a number of servers in the distributed storage system; a number of storage devices per server in the distributed storage system; a capacity of each storage device in the distributed storage system; the resiliency scheme used by the in the distributed storage system; a network bandwidth for recovery; and a storage device bandwidth for recovery.

18. The processing system of claim 16, wherein the network recovery bandwidth is a fixed amount of bandwidth of a network of the distributed storage system that has been reserved for recovering from errors of the components of the distributed storage system.

19. The processing system of claim 16, wherein the failure model is obtained from a manufacturer of the component.

20. The processing system of claim 16, wherein the failure model is obtained based on an observed failure history of a component type.

* * * * *